US 11,954,307 B2

(12) United States Patent
Vinay et al.

(10) Patent No.: US 11,954,307 B2
(45) Date of Patent: Apr. 9, 2024

(54) VISUAL SELECTOR FOR APPLICATION ACTIVITIES

(71) Applicant: SAMSUNG ELECTRONICS CO., LTD., Gyeonggi-Do (KR)

(72) Inventors: Deepali Vinay, Sunnyvale, CA (US); Shivangi Jain Mehra, Palo Alto, CA (US); Savan Kiran, Milpitas, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/391,809

(22) Filed: Aug. 2, 2021

(65) Prior Publication Data
US 2022/0179530 A1 Jun. 9, 2022

Related U.S. Application Data

(60) Provisional application No. 63/121,776, filed on Dec. 4, 2020.

(51) Int. Cl.
*G06F 3/00* (2006.01)
*G06F 3/0482* (2013.01)
(Continued)

(52) U.S. Cl.
CPC .......... *G06F 3/0484* (2013.01); *G06F 3/0482* (2013.01); *G06F 3/0483* (2013.01)

(58) Field of Classification Search
CPC ..... G06F 3/0484; G06F 3/0482; G06F 3/0483
See application file for complete search history.

(56) References Cited

U.S. PATENT DOCUMENTS 9,111,236 B2  8/2015 Bonforte et al.
9,152,299 B2  10/2015 McCann et al.
(Continued)

FOREIGN PATENT DOCUMENTS

JP  2016151995 A  8/2016
KR  20180089085 A  8/2018
(Continued)

OTHER PUBLICATIONS

"Introduction to Activities," [online] Google, Android Developers [retrieved May 13, 2021], retrieved from the Internet: <https://developer.android.com/reference/android/app/Activity>, 7 pg.
(Continued)

*Primary Examiner* — Tadesse Hailu
*Assistant Examiner* — Andrew Chung
(74) *Attorney, Agent, or Firm* — Cuenot, Forsythe & Kim, LLC

(57) ABSTRACT

Visually selecting application activities can include superimposing a visual selector overlay on a page displayed on a device, the page corresponding to a foreground activity. The superimposing can be responsive to receiving user input invoking the foreground activity. Contextual information corresponding to the foreground activity can be detected. The contextual information can be presented to the user visually within the visual selector overlay. The contextual information can be automatically added to a list and the list stored electronically on the device in response to received user input. The list can be configured to contain contextual information selected from page displays corresponding to a plurality of activities relating to one or more apps stored on the device.

20 Claims, 7 Drawing Sheets

(51) Int. Cl.
  *G06F 3/0483*  (2013.01)
  *G06F 3/0484*  (2022.01)

(56) References Cited

U.S. PATENT DOCUMENTS

| | | | |
|---|---|---|---|
| 9,342,490 B1 | 5/2016 | Taylor et al. | |
| 10,445,116 B1* | 10/2019 | Lauka | G06F 3/04886 |
| 10,445,314 B1* | 10/2019 | Sundararaman | G06F 3/023 |
| 10,459,887 B1* | 10/2019 | Dvortsov | G06F 3/0362 |
| 10,467,599 B1* | 11/2019 | Gardner | H04L 12/1822 |
| 10,684,942 B2 | 6/2020 | Dermer et al. | |
| 10,866,692 B2 | 12/2020 | Freestone et al. | |
| 11,210,730 B1* | 12/2021 | Woodyard | G06Q 20/12 |
| 2010/0205530 A1 | 8/2010 | Butin et al. | |
| 2012/0158421 A1* | 6/2012 | Dove | G06Q 10/00 705/2 |
| 2012/0185886 A1* | 7/2012 | Charania | H04N 21/8173 725/2 |
| 2013/0198030 A1 | 8/2013 | Linden et al. | |
| 2014/0053102 A1* | 2/2014 | Lee | G06F 3/0482 715/810 |
| 2014/0137020 A1* | 5/2014 | Sharma | G06F 3/0486 715/810 |
| 2014/0172892 A1 | 6/2014 | Schechter et al. | |
| 2015/0040030 A1 | 2/2015 | Artz | |
| 2015/0074582 A1* | 3/2015 | Shearer | G06F 3/0481 715/771 |
| 2015/0149951 A1* | 5/2015 | Magistrado | G06F 40/143 715/777 |
| 2015/0220225 A1* | 8/2015 | Jiang | G06Q 30/0641 705/26.8 |
| 2015/0242374 A1* | 8/2015 | Kong | G06F 40/106 715/201 |
| 2016/0018951 A1 | 1/2016 | Grabar et al. | |
| 2016/0196041 A1* | 7/2016 | Lavoie | G06F 3/04842 715/822 |
| 2016/0196584 A1 | 7/2016 | Franklin et al. | |
| 2016/0314432 A1* | 10/2016 | Bhatti | G06F 3/0482 |
| 2016/0321041 A1* | 11/2016 | Cavalcante | H04M 7/0021 |
| 2016/0342290 A1* | 11/2016 | Mathur | G06F 3/0488 |
| 2017/0076348 A1* | 3/2017 | Jennings | G06Q 30/0621 |
| 2017/0098206 A1* | 4/2017 | Blucher | G06Q 20/202 |
| 2017/0185251 A1 | 6/2017 | Jain | |
| 2017/0357439 A1 | 12/2017 | Lemay et al. | |
| 2018/0129994 A1* | 5/2018 | Fowler | G06Q 10/109 |
| 2018/0217736 A1 | 8/2018 | Nam et al. | |
| 2018/0225132 A1 | 8/2018 | Pierce et al. | |
| 2018/0341397 A1* | 11/2018 | Lu | G06F 3/04847 |
| 2018/0364856 A1 | 12/2018 | Seo et al. | |
| 2019/0035010 A1* | 1/2019 | Ittah | G06F 3/0482 |
| 2019/0379783 A1* | 12/2019 | Zhu | G06F 3/04812 |
| 2021/0060429 A1* | 3/2021 | Juenger | G06F 3/0482 |
| 2021/0312100 A1* | 10/2021 | Hesnor | G06F 30/13 |
| 2021/0334880 A1* | 10/2021 | Westphal | G06Q 30/0633 |
| 2022/0151512 A1* | 5/2022 | Sergeev | A61B 5/0205 |

FOREIGN PATENT DOCUMENTS

| | | |
|---|---|---|
| KR | 20180136736 A | 12/2018 |
| KR | 20180136982 A | 12/2018 |
| KR | 20190107060 A | 9/2019 |
| WO | 2016200704 A1 | 12/2016 |

OTHER PUBLICATIONS

"Manage Profiles, DataWedge 8.2," [online] Zebra Technologies Corp. © 2020, [retrieved May 13, 2021], retrieved from the Internet: <https://techdocs.zebra.com/datawedge/8-2/guide/createprofile/>, 10 pg.

WIPO Appln. No. PCT/KR2021/015238, International Search Report, dated Feb. 3, 2022, 4 pg.

WIPO Appln. No. PCT/KR2021/015238, Written Opinion, dated Feb. 3, 2022, 4 pg.

* cited by examiner

500

┌─────────────────────────────────────────────────────────────────────────────┐
│ Superimpose, with a contextual overlay system, a visual selector overlay on a page displayed on a │
│ device, the page corresponding to a foreground activity and the superimposing responsive to │
│ receiving user input invoking the foreground activity │
│ 502 │
└─────────────────────────────────────────────────────────────────────────────┘
                                        ▼
┌─────────────────────────────────────────────────────────────────────────────┐
│ Detect contextual information corresponding to the foreground activity │
│ 504 │
└─────────────────────────────────────────────────────────────────────────────┘
                                        ▼
┌─────────────────────────────────────────────────────────────────────────────┐
│ Present the contextual information to the user visually within the visual selector overlay │
│ 506 │
└─────────────────────────────────────────────────────────────────────────────┘
                                        ▼
┌─────────────────────────────────────────────────────────────────────────────┐
│ Add, with the contextual overlay system, the contextual information to a list and store the list on │
│ the device in response to received user input, the list configured to contain contextual information │
│ selected from page displays corresponding t a plurality of activities relating to one or more apps │
│ stored on the device │
│ 508 │
└─────────────────────────────────────────────────────────────────────────────┘

FIG. 5

VISUAL SELECTOR FOR APPLICATION ACTIVITIES

CROSS-REFERENCE TO RELATED APPLICATIONS

This application claims the benefit of U.S. Provisional Patent Application No. 63/121,776 filed on Dec. 4, 2020, which is incorporated herein by reference in its entirety.

TECHNICAL FIELD

This disclosure relates to applications implemented in processor-executable code executing on a device, and more particularly, to navigating among multiple applications concurrently running on the device.

BACKGROUND

An application, also referred to as an "app," is a software program that can run on one or more different devices. Having evolved over a relatively short span of time, apps for performing a wide variety of different functions are increasingly implemented as small programs that run on mobile devices, such as smartphones and tablets, as well as PCs and other computers. Indeed, while there are many apps for various types of devices, a vast majority of apps currently are ones specifically designed to run on mobile devices. Apps typically can be easily and quickly installed or removed from a device without affecting the device's system software or other apps stored on the device.

SUMMARY

In one or more embodiments, a method includes superimposing a visual selector overlay on a page displayed on a device, wherein the page corresponds to a foreground activity and wherein the superimposing is responsive to receiving user input invoking the foreground activity. The method includes detecting contextual information corresponding to the foreground activity and presenting the contextual information to the user visually within the visual selector overlay. The method includes automatically adding the contextual information to a list and storing the list on the device in response to received user input, wherein the list is configured to contain contextual information selected from page displays corresponding to a plurality of activities relating to one or more apps stored on the device.

In one or more embodiments, a system includes a processor configured to initiate operations. The operations include superimposing a visual selector overlay on a page displayed on a device, wherein the page corresponds to a foreground activity and wherein the superimposing is responsive to receiving user input invoking the foreground activity. The operations include detecting contextual information corresponding to the foreground activity and presenting the contextual information to the user visually within the visual selector overlay. The operations include automatically adding the contextual information to a list and storing the list on the device in response to received user input, wherein the list is configured to contain contextual information selected from page displays corresponding to a plurality of activities relating to one or more apps stored on the device.

In one or more embodiments, a computer program product includes one or more computer readable storage media having instructions stored thereon. The instructions are executable by a processor to initiate operations. The operations include superimposing a visual selector overlay on a page displayed on a device, wherein the page corresponds to a foreground activity and wherein the superimposing is responsive to receiving user input invoking the foreground activity. The operations include detecting contextual information corresponding to the foreground activity and presenting the contextual information to the user visually within the visual selector overlay. The operations include automatically adding the contextual information to a list and storing the list on the device in response to received user input, wherein the list is configured to contain contextual information selected from page displays corresponding to a plurality of activities relating to one or more apps stored on the device.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 5 is a flowchart of an example method of visually selecting contextual information from activities of one or more apps running on a device.

DETAILED DESCRIPTION

Figure 1:
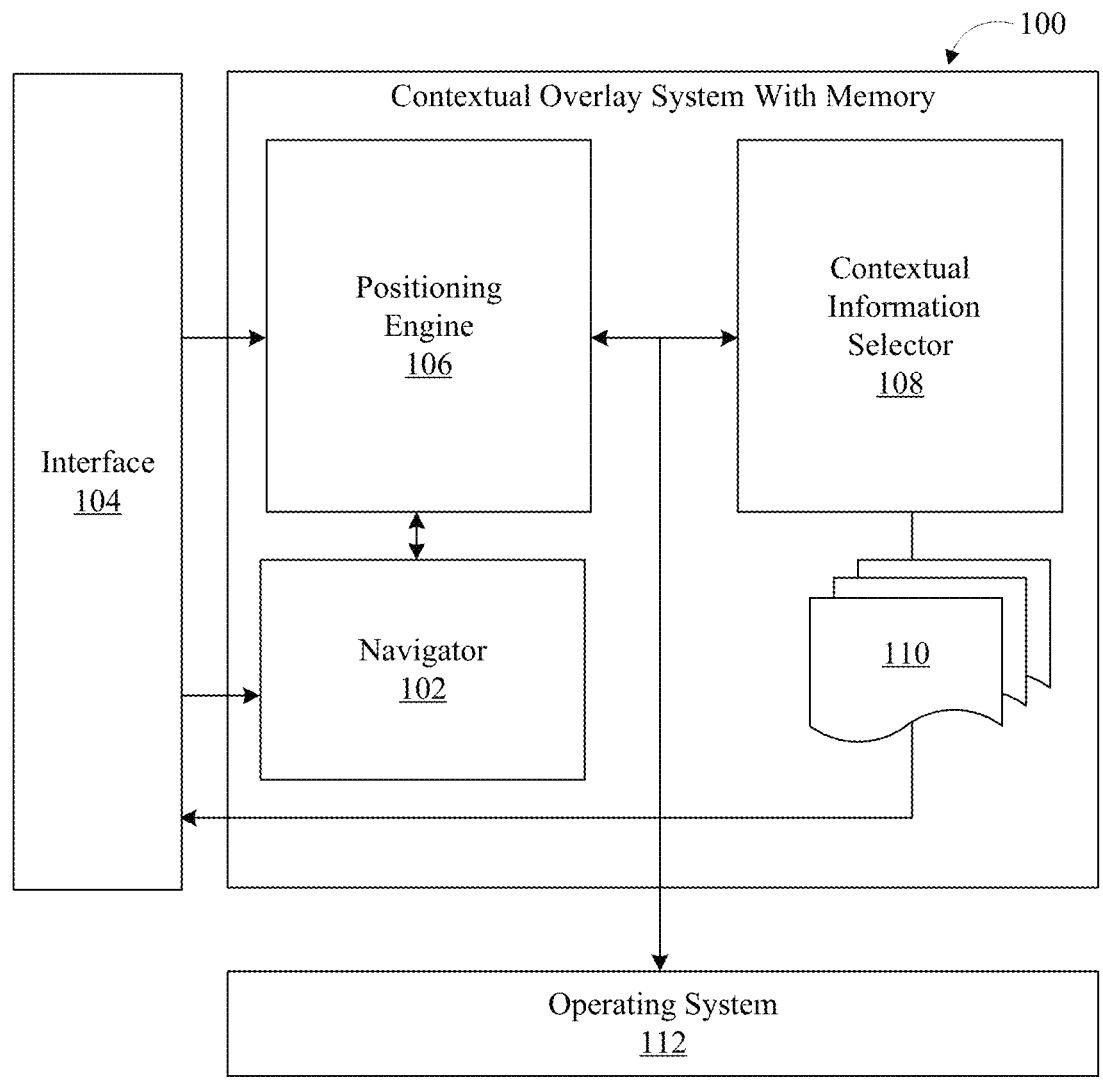
FIG. 1 depicts an example visual selector system with memory.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to applications implemented in processor-executable code executing on a device, and more particularly, to navigating among multiple applications concurrently running on a device.

In the context of an Android app built using Application Programming Interfaces (APIs) in the Android framework, for example, apps can operate through multiple activities. An "activity" is something that a user can do with the app, such as perform an action or control an event. Virtually all Android activities interact with a user. An Android activity class can create for the user a window in which the user can place a user interface (UI). Thus, an activity serves as an entry point for a user's interaction with an Android app UI. The activity provides the window into which the app draws a UI, which allows the user to engage in the activity. For example, with an email app, a UI for the compose activity will show the user a compose email option. Similarly, for example, a UI for the inbox activity of the email app will show the user emails that the user has received with the app.

One method implemented by an activity class operates by the user initializing the user's activity with a layout resource defining a UI and retrieving widgets in the UI that the user interacts with programmatically. Another method pertains to the user pausing active interaction with the activity with any changes made by the user at this point being committed and the activity state remaining visible on a screen.

An app that the user is currently interacting with is defined as a "foreground app." An activity of the app that the user is currently interacting with is defined as the "foreground activity." The app to which the foreground activity belongs becomes the foreground app.

An app that the user is not currently interacting with but that is running in the background is a "background app."

An "app overlay" comprises information snippets displayed by a background app as a floating graphical user interface (GUI) element on top of a foreground activity's UI.

An app overlay that shows contextual information based on the foreground activity is referred to as a "contextual app overlay."

Many apps run on devices that implement a framework having a capture feature. The capture feature can automatically identify objects external to the device, collect data relating to the objects, and enter the data automatically without human interaction into the device for processing and/or storage. For example, a feature of Samsung's Knox® ecosystem is Knox Capture® for handling scanning logic for business apps. Knox Capture® is a data-capture engine that is configured to trigger camera adjustment features built into certain Samsung devices and that orchestrates input, formatting, and output of scanned barcode data. IT administrators using Knox Capture® can rapidly setup and manage barcode capture for business apps.

Notwithstanding the advantages provided by a data capture app, enabling the scanning functionalities and related configurations across multiple pages within third-party apps can be complex and nonintuitive, often leading to errors. Configuring and linking to different activities of a third-party app can likewise be difficult—especially for non-technical users—and are also prone to errors.

An aspect of the systems, methods, and computer program products disclosed herein is a light weight, easily accessible visual selector overlay. The visual selector overlay is a specific type of contextual app overlay, as defined above. The visual selector overlay visually displays to a user "contextual information," which as defined herein is information that is contained in or related to an activity of an application. The visual selector overlay can be implemented with a contextual overlay system with memory. The contextual overlay system with memory can be integrated in, or operatively coupled with, for example, a data capture app or service. With the visual selector overlay, a user can intuitively select and capture contextual information from app activities. Another aspect of the contextual overlay system with memory is that the user can select and capture app activities while seamlessly navigating across multiple third-party apps installed on the device. In accordance with inventive arrangements described herein, example methods, systems, and computer program products are provided that enable a user to select contextual information from multiple activities (e.g., pages displayed on a device screen) of one or more third-party applications.

Another aspect of the contextual overlay system with memory disclosed herein is that as a user navigates among third-party apps selecting and storing contextual information, the third-party apps remain agnostic. That is, there is no changing of the underlying code of any third-party apps as a user navigates among the third-party applications and selects contextual information from the activities.

The contextual overlay system with memory, enables the user to navigate to any activity of the user's choosing from any app. Superimposing the visual selector overlay on the page corresponding to an app activity allows the user to observe contextual information displayed by a foreground activity of an app running on a device in which the contextual overlay system with memory is implemented. With the visual selector overlay superimposed on a page corresponding to an app activity, the user can select and add the underlying contextual information to a newly created or previously saved list. The user can continue navigating among different activities of one or more apps, selecting and automatically storing contextual information in response to user input to the contextual overlay system with memory.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates example visual overlay system with memory (system) 100. System 100 can be implemented in software and/or hardware of a computer or other device (e.g., portable device) such as device 600 of FIG. 6. In certain arrangements, system 100 is implemented in processor-executable code that is electronically stored in a memory such as memory 602 and that runs on a processor such as processor 604 of device 600. Implemented in a device such as device 600, system 100 illustratively includes navigator 102, which enables a user of the device to navigate among third-party apps installed on the device. The user navigates among the third-party apps based on input supplied by the user via interface 104, which operatively couples with navigator 102. In certain arrangements, for example, interface 104 is a touchscreen layered over a visual display of the device to enable the user to navigate among the third-party apps using single- or multi-touch gestures.

System 100 illustratively includes positioning engine 106 also operatively coupled with interface 104 for positioning a visual selector overlay within a screen display of the device in response to user input. User input can invoke or launch a third-party app. A page corresponding to an activity relating to the third-party app is displayed in response to the invoking of the third-party app. When invoked, the third-party app becomes the foreground app, and the activity a foreground activity. Additionally, in response to the user input invoking or launching the third-party app, positioning engine 106 superimposes the visual selector overlay on the page corresponding to the activity of the third-party app. The visual selector overlay "floats" in the sense that user input to positioning engine 106 can move the visual selector overlay, positioning the visual selector overlay so as not to obscure or impede the user's view of the page. In certain arrangements, in which interface 104 is a touchscreen layered over a visual display of the device, the user can move the visual selector overlay over the page using single- or multi-touch gestures. In other arrangements, depending on the nature of the device, the user can move the visual selector overlay using a stylus, cursor, or other mechanism to provide input to positioning engine 106 to position the visual selector overlay over the page.

The visual selector overlay is capable of visually presenting contextual information to the user. In some examples, the visual selector overlay is capable of detecting contextual information that is then presented to the user. The contextual information may be included within the visual selector overlay itself. The contextual information presented visually to the user within the visual selector overlay can vary depending on the third-party app and the app activity. For example, contextual information can be a character string (e.g., app name, activity name), icon, or another object related to the app activity whose page is displayed by the device. Contextual information, for example, can comprise a data entry element of the UI of a device. Contextual information can comprise any information pertaining to the third-party app or an activity related to the third-party app.

Illustratively, system 100 also includes contextual information selector 108. Responsive to user input selecting contextual information presented visually within the visual selector overlay, contextual information selector 108 automatically adds the contextual information to list 110. List 110 can contain previously captured contextual information, if any, or if no contextual information was previously selected and saved, can be newly generated by contextual information selector 108. Contextual information selector 108 can automatically add the contextual information to list 110 in real time.

In certain arrangements, system 100's interactions with operating system 112 (e.g., through hidden APIs) include receiving a callback event whenever the foreground activity of the foreground app changes. The callback can also contain contextual information pertaining to the foreground activity as payload (e.g., activity name, app name, icon). The payload can provide the contextual information visually presented to the user in the visual selector overlay. For example, if the payload contains the name of an activity related to a third-party app, then the visual selector overlay can visually display the activity name when the visual selector overlay is superimposed on the page corresponding to the activity.

System 100 can also receive a user's interaction feedback. Contextual information selector 108 in response to received input of the user selects contextual information to be saved and automatically adds the contextual information to list 110 of previously selected items or a newly created list, as described above. The contextual information can be added and saved to the list in real time. So, too, in response to user input, contextual information selector 108 can deselect contextual information previously added to list 110, the deselected contextual information is discarded rather than being added to previously selected contextual information or a newly created list.

Operating system 112, in accordance with certain arrangements, intercepts the foreground activity transitions with an Activity Resumed method of the ActivityTaskManagerService class. Once intercepted, the onForegroundActivityChanged callback is invoked with relevant contextual information as payload. System 100, in various arrangements, is configured to cooperatively operate in conjunction with different types of operating systems that perform similar and/or the same system-related actions. System 100 visually displays the relevant contextual information of the payload to the user within the visual selector overlay, as described above.

Figure 2:
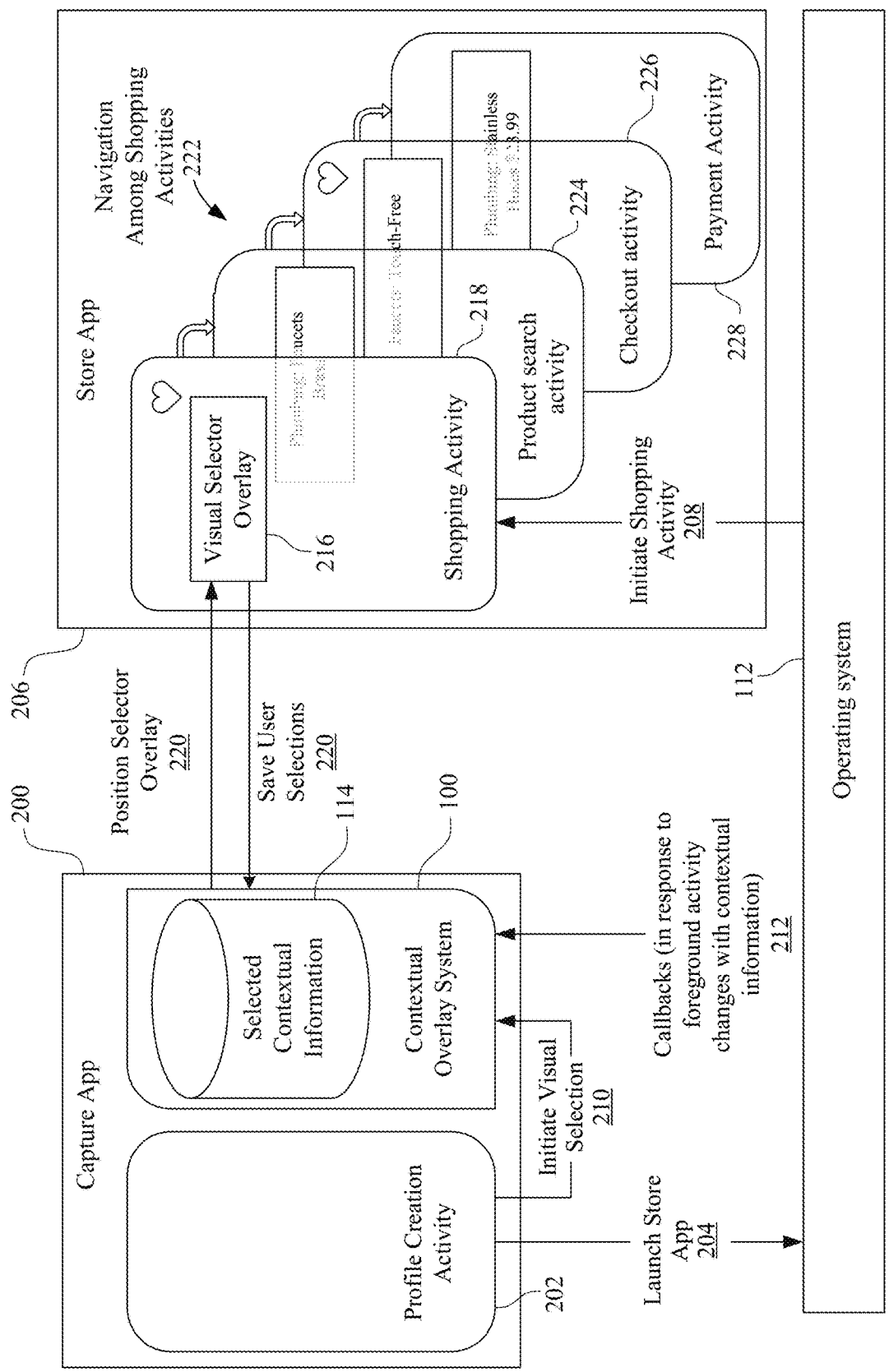
FIG. 2 illustrates certain operative aspects of the system of FIG. 1.
Figure 6:
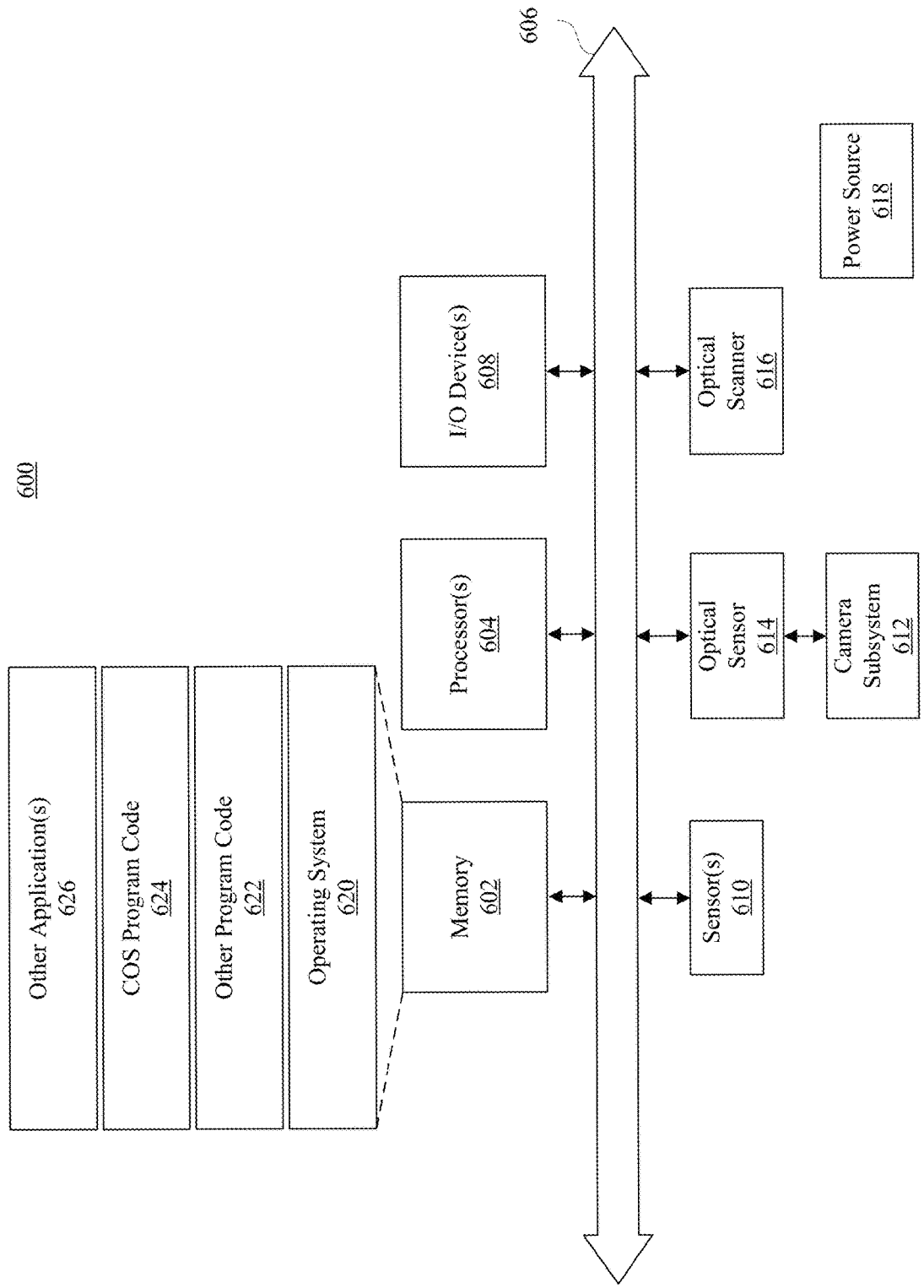
FIG. 6 depicts an example device in which the system of FIG. 1 can be implemented.

Referring additionally to FIG. 2, certain operative features of system 100 are illustrated, with system 100 implemented in capture app 200 (e.g., Knox Capture app) running on a device such as device 600 (FIG. 6). Operatively, profile creation activity 202 initially issues signal 204 to operating system 112, instructing operating system 112 to launch store app 206. Store app 206 is illustratively an app created by an enterprise to enable users to shop remotely from a home, office, or other location for products sold by the enterprise. Operating system 112 performs operations 208 to initiate running of store app 206 on the device. Concurrently with invoking the app, profile creation activity 202 invokes operations of system 100 with signal 210. Operating system callbacks 212 change contextual information in response to changes in the foreground activity as the user navigates among various activities of one or more apps using navigator 102.

Positioning engine 106 performs operations 214, superimposing visual selector overlay 216 over the page visually rendering a foreground activity—namely, shopping activity 218 of store app 206. The contextual information visually displayed within visual selector overlay 216 can be, for example, the foreground activity name. User options provided by system 100 allow the user to select or deselect contextual information, as described above. Using a select option, the user can invoke operations 220 performed by contextual information selector 108. Performing operations 220, contextual information selector 108 selects the contextual information over which visual selector 216 is positioned within home shopping activity 218 and saves the contextual information to list 110. Using navigator 102, the user can invoke operations 222 to navigate among other activities of store app 206. The other activities illustratively include product search activity 224, checkout activity 226, and payment activity 228. By positioning engine 106 superimposing visual selector overlay 216 on each of the corresponding pages, the user can select and save contextual information displayed within any other activities (from the same or other apps) using contextual information selector 108. Optionally, selected contextual information from multiple activities of one or more apps can be electronically stored in database 114.

In certain arrangements, a user launches system 100 and, from within system 100, receives input pertaining to one or more activities of an app. The input received enables the user to launch one of the activities, which in response, executes as a foreground activity.

Displaying the corresponding name of an activity in the visual selector overlay within a page of a third-party app enables a user to readily and easily visualize an association that associates the page with the corresponding activity name visually displayed to the user within the visual selector overlay.

Figure 3A:
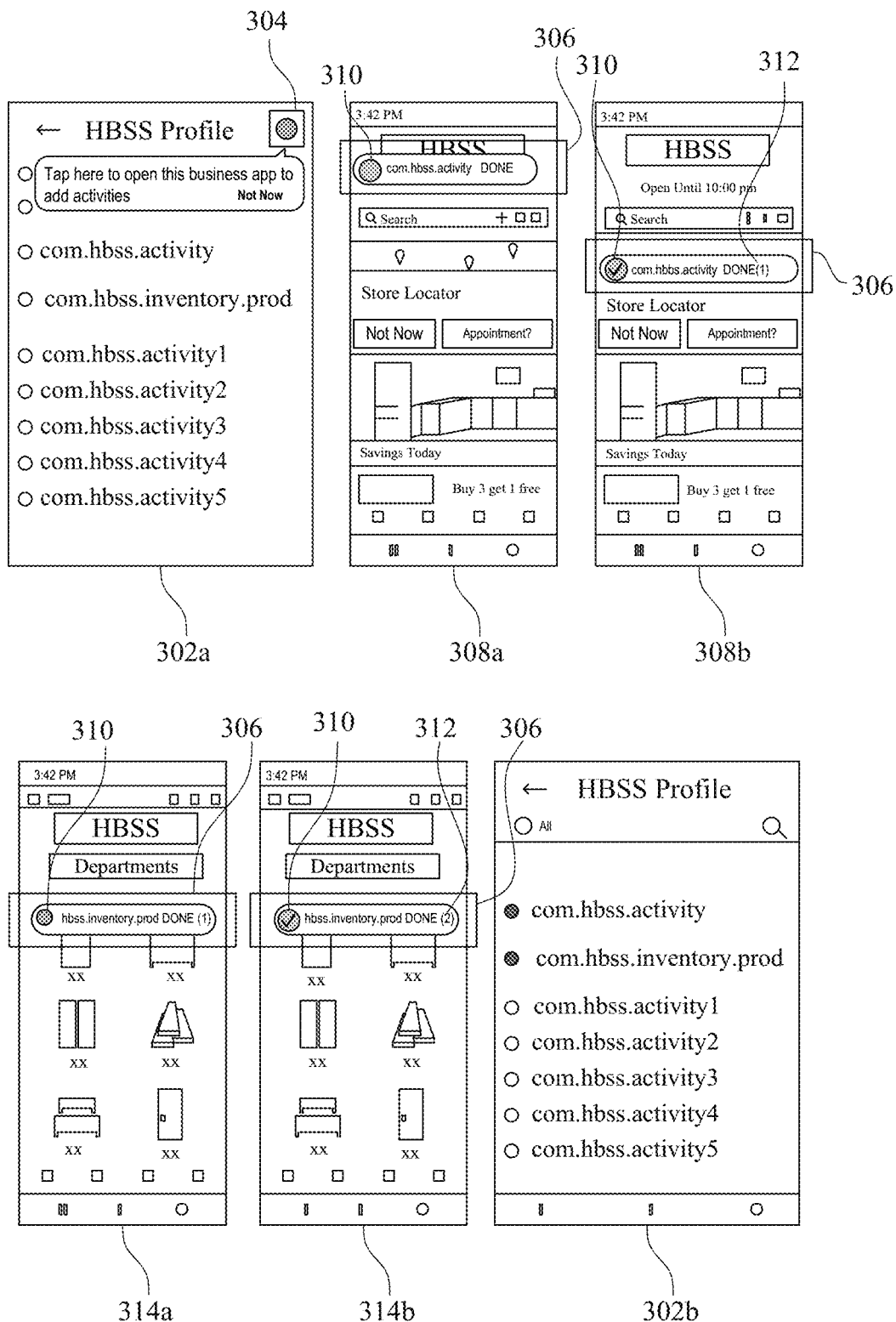
FIGS. 3A and 3B illustrate certain other operative aspects of the system of FIG. 1.
Figure 3B:
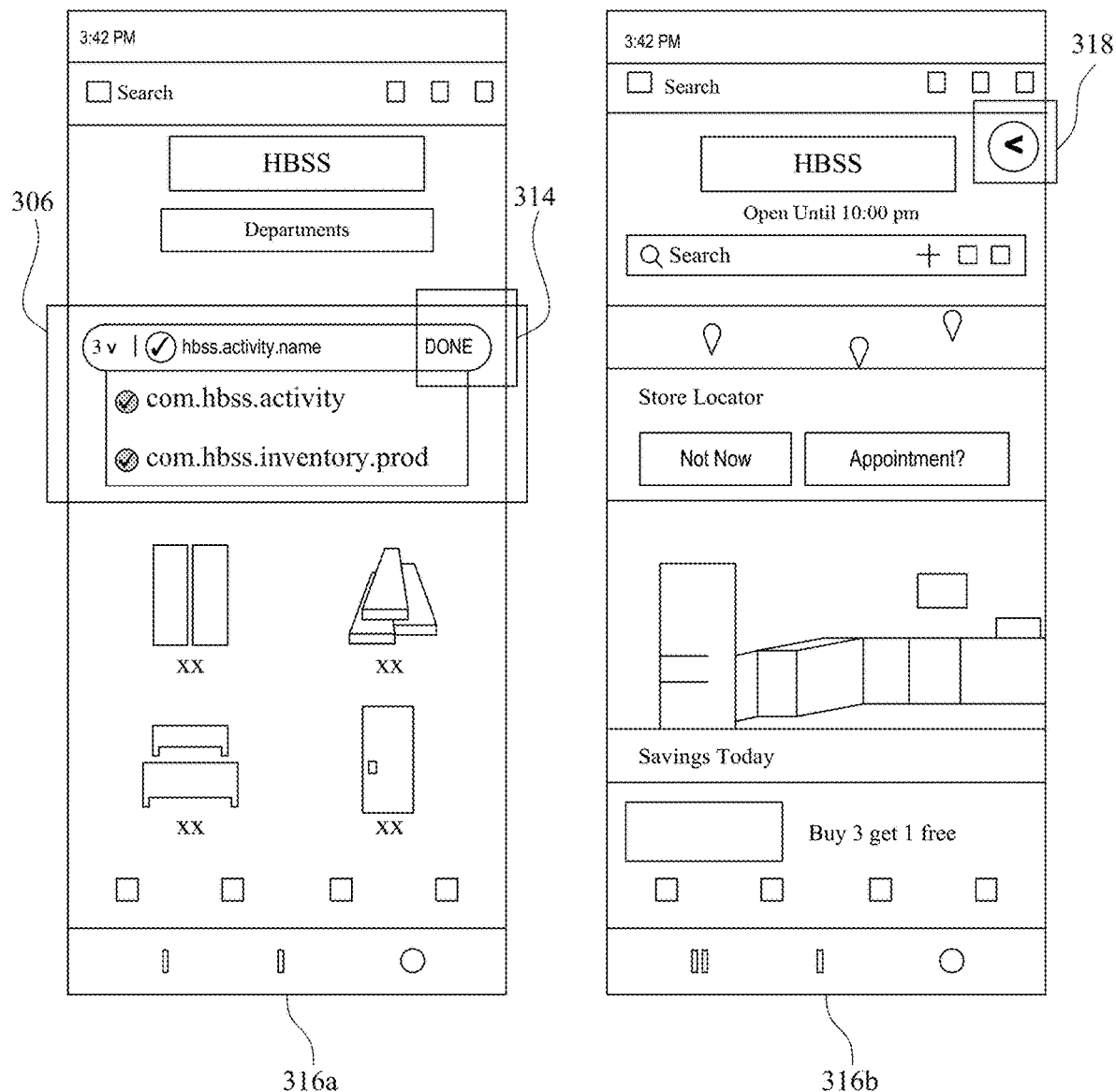

Referring additionally to FIGS. 3A and 3B, certain operative aspects of system 100 are illustrated. Page 302a, shown on the screen of a device, displays an example list of activities related to an example app, home building supply store (hbss). Displayed above the activities, is button 304. In certain arrangements, the user taps button 304 to open an activity of the app. System 100 can determine the activity name and open the activity with the visual selector overlay 306 superimposed on page 308*a* corresponding to the activity. The name of the activity, com.hbss.activity, which is received from the operating system callback is visually displayed to the user within visual selector overlay 306.

Page 308*a* displays the initial UI of an activity when the app is launched on the device. Other UIs corresponding to other activities are displayed as the user navigates among the activities using the internal navigational controls of the app itself. The user illustratively taps circle 310 to select the activity whose name, com.hbss.activity, is visually displayed within visual selector overlay 306. In display 308*b* visual selector overlay 306 in response to the user input includes a check mark in 310 of visual selector overlay 306. The selection of activity com.hbss.activity increments counter 312 displayed within visual selector overlay 306. Data captured (e.g., activity name) in response to user input can be saved electronically in memory (e.g., random access memory) of the device in which system 100 is implemented and stored on a disk or other memory element in response to the user input. Captured data, in certain arrangements, is saved in response to user tapping "Done" adjacent counter 312, which can also re-invoke operations of the capture app or data-capture engine implemented in the device in which system 100 is implemented and that cooperatively operates in conjunction with system 100.

The user next navigates to another activity. Visual selector overlay 306 is superimposed on page 314*a* corresponding to the activity. The name of the activity, com.hbss.inventory.prod, is determined as described above and is visually displayed within visual selector overlay 306 superimposed on page 314*a*, the activity pertaining to product inventory. Circle 310 is reset by clearing the checkmark. The user again taps circle 310 to automatically select activity com.hbss.inventory.prod. In display 314*b*, circle 310 contains a checkmark and counter 312 shows a count of 2, for the two activities selected. The user taps "Done" (positioned adjacent counter 312) to navigate seamlessly back to the data capture service, and the list of selected activities are displayed to the user. The user's tapping causes the selected activities to be added to the list, with checkmarks indicating newly selected activities. The updated list is shown in display 302*b*, which lists the names of activities corresponding to example app home building supply store (hbss) with checkmarks indicating the activities selected in response to the user input.

Visual selector overlay 306, as a floating object, can be moved around within pages displayed on a device screen in response to user input so as not to obscure the user's view of the displayed activity or limit user accessibility to any portion of any activity of an app. The floating aspect of visual selector overlay 306 allows visual selector overlay 306 to persist on the screen throughout a user session without impeding the user's ability to navigate among multiple activities and even among multiple apps. Visual selector overlay 306 is automatically reset each time that the user navigates to a different activity. Accordingly, once the user navigates from one activity to a new one, the check in circle 310 is automatically eliminated while retaining the prior selection in a temporary buffer or area of memory. Any action with respect to visual selector overlay 306 operates only to add the new activity to which the user has navigated but does not affect the prior ones.

Displaying contextual information within the visual selector overlay, such as the activity name corresponding to the page on which the visual selector overlay is superimposed, provides distinct advantages to the user. The visual selector overlay visually displays the contextual information (e.g., activity name) as the user is physically viewing the page to which the contextual information relates. This enables a user to readily and easily visualize an association, which associates the page and page experience with the corresponding contextual information related to the page such as the activity name, which is visually displayed to the user within the visual selector overlay.

This is advantageous, for example, to an IT admin who, while creating an app profile, must select from among different activities those activities for which the user will invoke a barcode scan. The IT admin defines camera settings for the user and sets the barcode formatting for those activities related to one or more third-party apps that will utilize the barcode scan. Allowing the IT admin to visually select and capture the relevant activities while navigating seamlessly across the third-party apps eliminates the burden on the IT admin of having to select activities from a list of similar looking, nonintuitive names.

In certain arrangements, system 100 provides the user additional options. One option is to expand the visual selector overlay. Another option is to collapse the visual selector overlay. In the specific context of navigating among activities associated with the home building supply app illustrated in FIGS. 3A and 3B, for example, a user-initiated operation expands visual selector overlay 306 superimposed on page 316*a*. Expanded, visual selector overlay 306 displays previously selected contextual information which are related. For example, expanding visual selector overlay 306 can display a plurality of activities that are related to one another by having been selected during the same user session, which in the current context are the activities identified by the activity names, com.hbss.activity and com.hbss.inventory.product. Another user-initiated operation causes system 100 to collapse visual selector overlay 306 as shown in display 316*b*. When collapsed, the visual selector overlay can appear as a size-diminished circle 318 or other reduced-sized object.

Figure 4:
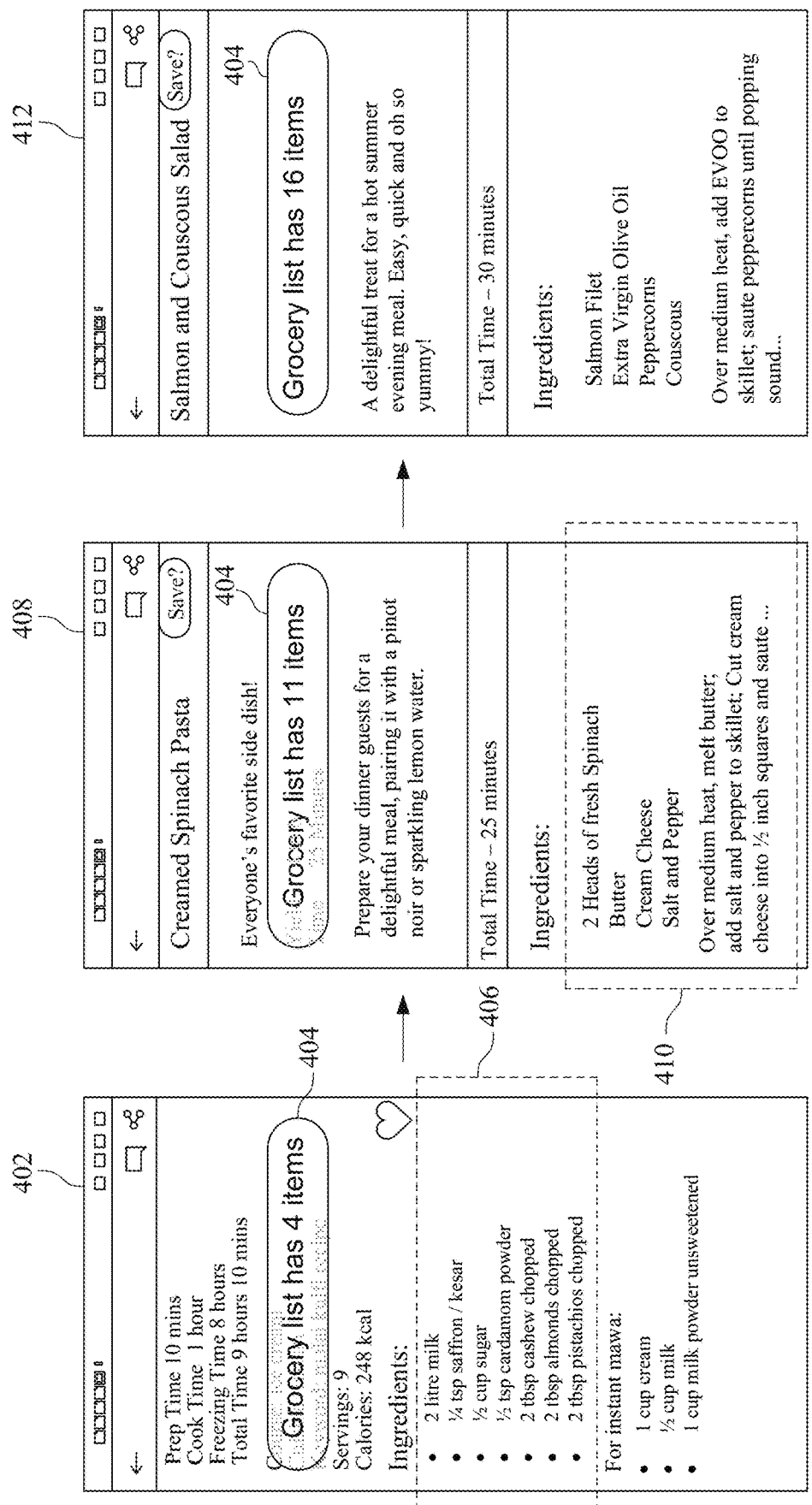
FIG. 4 illustrates still other operative aspects of the system of FIG. 1.

The visual selector overlay can display any type of contextual information related to an activity on whose page the visual selector overlay is superimposed. FIG. 4 illustrates certain operative aspects of system 100 in compiling, for example, a grocery list of recipe ingredients for several different dishes. As the application illustrates, contextual information shown in the visual selector overlay is not limited, for example, to foreground activity names, app names, or icons. Instead, the contextual information can be any information that contextually pertains to the current foreground activity whose page is displayed on the screen of a device. For example, page 402 illustratively corresponds to an activity of a cooking app (e.g., online cooking web site) pertaining to preparing a frozen dessert. Visual selector overlay 404 selects and stores ingredients displayed on page 402. The ingredients, shown in bounding box 406, can be captured from text generated using screen scraping to convert the visual image displayed to text. The user can select the ingredients with operations performed by contextual information selector 108.

Operations automatically performed by contextual information selector 108 can initiate creation of a grocery list or add the selected ingredients to an existing grocery list of recipe ingredients (e.g., ingredients for the frozen dessert illustrated above are added to a grocery list of four items). Visual selector overlay 404 can visually display the count of the number of ingredients listed. With operations performed by navigator 102, the user can next navigate to page 408 corresponding to an activity of the same or a different app and pertaining to a recipe for creamed spinach pasta. Operations performed by contextual information selector 108 can update the grocery list to include the newly added ingredients, the count visually displayed by visual selector overlay 404. The user can continue by navigating to activity 408 of the same or a different cooking app to select and save yet more recipe ingredients, shown in bounding box 410, which can be added to the list, with count of visual selector overlay 404 increasing accordingly. Navigating to page 412, the user can add still another ingredient to the grocery list of ingredients, increasing again the count visually displayed by visual selector 404. By the successive addition of ingredients for different recipes, system 100 enables the user to create a kind of universal grocery list by merely selecting and saving ingredients from foreground activities of the same app or multiple different cooking apps. The compiling of a grocery list of ingredients from one or more apps is merely illustrative. It will be readily apparent to one skilled in the art that the apps may be of different types. For example, the user can generate a shopping list that includes different types of items, such as building repair items from a home building supply store along with food and groceries items from a grocery store. System 100 can also export the list compiled from one or more activities of one app to those of any other app.

FIG. 5 is a flowchart of example method 500 for selecting and storing contextual information from one or more activities pertaining to one or more apps. Method 500 can be performed by a contextual overlay system such as the systems described with respect to FIGS. 1-4. At block 502, the system superimposes a visual selector overlay on a page displayed on a device. The page corresponds to a foreground activity. The system superimposes the visual selector overlay on the pate in response to receiving user input invoking the foreground activity. The user can invoke the foreground activity from within the system 100, which may have already been invoked.

At block 504, the system detects contextual information corresponding to the foreground activity. The system, at block 506, presents the contextual information to the user visually within the visual selector overlay.

At block 508, the system adds the contextual information to a list and stores the list on the device in response to received user input. The list is configured to contain contextual information selected from page displays corresponding to a plurality of activities relating to one or more apps stored on the device.

The system can enable a user to navigate between two or more of the plurality of activities. The navigation is performed by the system in response to receiving user input replacing one activity with another activity as the foreground activity running on the device. With the system, the user can select contextual information from the two or more activities. The system automatically adds the contextual information selected based on the user input to the list.

In response to receiving further user input specifying one or more modifications to the list, the system can modify the list based on the one or more modifications specified. The system can perform the modifying without the user navigating between the plurality of activities.

In response to user input sequentially invoking two or more apps and receiving user input identifying contextual information in page displays corresponding to activities relating to the two or more apps, the system can automatically add the contextual information identified to the list.

The visual selector overlay, in some arrangements, is collapsible and expandable. The system can receive additional user input identifying an activity within the list. In response to the additional user input the system can expand the visual selector overlay. The expanded visual selector overlay can display a plurality of activities related the activity identified based on the received user input.

The visual selector overlay can be implemented as an object that floats over the page on which the visual selector overlay is superimposed. In response to further user input, the system can move the visual selector overlay over the page displayed on the device. The further user input can be input for example by the user applying single- or multi-finger movements to a touchscreen of the device.

FIG. 6 illustrates an example device 600 in accordance with one or more embodiments described within this disclosure. Device 600 can include a memory 602, one or more processors 604 (e.g., image processors, digital signal processors, data processors), and interface circuitry 606.

In one aspect, memory 602, processor(s) 604, and/or interface circuitry 606 are implemented as separate components. In another aspect, memory 602, processor(s) 604, and/or interface circuitry 606 are integrated in one or more integrated circuits. The various components of device 600 can be coupled, for example, by one or more communication buses or signal lines (e.g., interconnects and/or wires). In one aspect, memory 602 can be coupled to interface circuitry 606 via a memory interface (not shown).

One or more I/O device(s) 608 can be coupled to interface circuitry 606 directly or through one or more intervening I/O controllers (not shown). Examples of I/O devices 608 include, for example, display devices, touch-sensitive display devices, track pads, keyboards, pointing devices, communication ports (e.g., USB ports), network adapters, buttons or other physical controls, and so forth. A touch-sensitive device such as a display screen and/or a pad is configured to detect contact, movement, breaks in contact, and the like using any of a variety of touch sensitivity technologies. Example touch-sensitive technologies include, for example, capacitive, resistive, infrared, and surface acoustic wave technologies, other proximity sensor arrays or other elements for determining one or more points of contact with a touch-sensitive device, and the like. One or more of I/O devices 608 can be adapted to control functions of sensors, subsystems, and such of device 600.

Accordingly, one or more sensor(s) 610, other subsystems and/or other devices also can be coupled to interface circuitry 606 to facilitate the functions and/or operations described herein. For example, camera subsystem 612 can be operatively coupled to optical sensor 614, which in turn is coupled to interface circuitry 606. Optical sensor 614 can be implemented using any of a variety of technologies. Examples of optical sensor 614 include a charged coupled device (CCD), a complementary metal-oxide semiconductor (CMOS) optical sensor, and the like. Camera subsystem 612 and optical sensor 614 can be used to facilitate camera functions, such as recording images and/or video clips (hereafter "image data"). In one aspect, image data is a subset of sensor data. Camera subsystem 612 or, optionally, a distinct scanner, optical scanner 616, can be used to capture bar codes or similar data.

Device 600 further includes a power source 618. Power source 618 able to provide electrical power to various elements of device 600. In one embodiment, power source 618 is implemented as one or more batteries. The batteries can be implemented using any of a variety of different battery technologies, whether disposable (e.g., replaceable)

or rechargeable. In another embodiment, power source 618 is configured to obtain electrical power from an external source and provide power (e.g., DC power) to the elements of device 600. In the case of a rechargeable battery, power source 618 further can include circuitry that is able to charge the battery or batteries when coupled to an external power source.

Memory 602 can include random access memory (e.g., volatile memory) and/or non-volatile memory, such as one or more magnetic disk storage devices, one or more optical storage devices, flash memory, and so forth. Memory 602 can store operating system 620, such as LINUX, UNIX, Android®, a mobile operating system, an embedded operating system, and the like. Operating system 620 can include instructions for handling system services and for performing hardware-dependent tasks.

Memory 602 can store other program code 622. Examples of other program code 622 can include instructions to facilitate communicating with one or more additional devices, one or more computers, and/or one or more servers; graphic user interface processing; processing instructions to facilitate sensor-related functions; phone-related functions; electronic messaging-related functions; Web browsing-related functions; media processing-related functions; GPS and navigation-related functions; security functions; camera-related functions, including Web camera and/or Web video functions; and so forth.

Memory 602 can include contextual overlay system (COS) program code 624 for implementing a contextual overlay system with memory (e.g., system 100). Memory 602 also can store one or more other applications 626, such as a data capture application.

The various types of instructions and/or program code described are provided for purposes of illustration and not limitation. The program code can be implemented as separate software programs, procedures, or modules. Memory 602 can include additional instructions or fewer instructions. Moreover, various functions of device 600 can be implemented in hardware and/or software, including in one or more signal processing and/or application-specific integrated circuits.

Program code stored within memory 602 and any data used, generated, and/or operated on by device 600 are functional data structures that impart functionality to a device when employed as part of the device. Further examples of functional data structures include, for example, sensor data, data obtained via user input, data obtained via querying external data sources, baseline information, and so forth. The term "data structure" refers to a physical implementation of a data model's organization of data within a physical memory. As such, a data structure is formed of specific electrical or magnetic structural elements within a memory. A data structure imposes physical organization on the data stored in the memory that is used by a processor.

In certain embodiments, one or more of the various sensors and/or subsystems described with reference to device 600 can be separate devices that are coupled or communicatively linked to device 600 through wired or wireless connections and can be implemented as separate systems or subsystems that operatively couple to device 600 by way of I/O devices 608 and/or a wireless communication subsystem (not shown).

Device 600 can include fewer components than those shown or include additional components other than those shown in FIG. 6 depending on the specific type of system that is implemented. Additionally, the particular operating system and/or application(s) and/or other program code included can also vary according to system type. Moreover, one or more of the illustrative components can be incorporated into, or otherwise form a portion of, another component. For example, a processor can include at least some memory.

Device 600 is provided for purposes of illustration and not limitation. A device and/or system configured to perform the operations described herein can have a different architecture than illustrated in FIG. 6. The architecture can be a simplified version of device 600 and can include a processor and memory storing instructions.

Example implementations of device 600 include, for example, a computer, a tablet, a portable device, or other such devices. As a portable device, device 600 can be implemented, for example, as smartphone or other mobile device, a wearable computing device (e.g., smartwatch), or a carriable, handheld electronic device. It will be appreciated that embodiments can be deployed as a standalone device or deployed as multiple devices in a distributed client-server networked system. For example, in certain embodiments, a smartwatch can operatively couple to a mobile device (e.g., smartphone). The mobile device can or cannot be configured to interact with a remote server and/or computer system.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the term "user" refers to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
 running a contextual overlay system on a device as part of a capture app concurrently with running an app installed on the device, wherein the contextual overlay system is configured to navigate the app;
 superimposing, by the contextual overlay system, a visual selector overlay on each of a plurality of pages of the app displayed on the device as the app runs on the device, wherein each page corresponds to a foreground activity of the app and wherein the superimposing is responsive to receiving user input navigating to the plurality of pages;
 detecting, by the contextual overlay system, contextual information corresponding to the foreground activity of each page of the plurality of pages by, in response to each foreground activity transition, receiving a callback from an operating system of the device, wherein the callback contains the contextual information as a payload, and wherein for each foreground activity transition the contextual information includes an activity name of an activity of the app, wherein the activity of the app is a member of an activity class that provides a window in which the respective page is presented as a user interface of the app;
 presenting to the user and within the visual selector overlay the contextual information for each foreground activity of the plurality of pages from the respective callback as each foreground activity is displayed; and
 responsive to a user selection of a selectable control displayed as part of the visual selector overlay, adding, using the contextual overlay system, the contextual information as displayed by the visual selector overlay for user selected ones of the plurality of pages to a list for the app and storing the list on the device in response to received user input, wherein the list specifies user-selected activities of the app determined from the plurality of pages as selected during navigation of the app by the user.

2. The method of claim 1, further comprising:
 updating the visual selector overlay responsive to each respective callback received in response to a foreground activity transition of the app to display the name of the foreground activity from the payload of the callback.

3. The method of claim 1, further comprising:
 receiving further user input specifying one or more modifications to the list; and
 modifying the list based on the one or more modifications specified;
 wherein the modifying is performed without the user navigating between the plurality of pages.

4. The method of claim 1, further comprising:
 displaying an interface that includes the list of the activities of the app; and
 in response to receiving a user input selecting an element displayed in the interface, opening an activity of the app.

5. The method of claim 1, wherein the visual selector overlay is collapsible and expandable.

6. The method of claim 5, further comprising:
 receiving further user input identifying an activity within the list; and
 responsive to additional user input expanding the visual selector overlay to display a plurality of activities related to the activity identified based on the further user input.

7. The method of claim 1, further comprising:
 setting barcode formatting for one or more of the activities of the list that utilize barcode scanning.

8. A system, comprising:
 a processor configured to initiate operations including:
 running a contextual overlay system on a device as part of a capture app concurrently with running an app installed on the device, wherein the contextual overlay system is configured to navigate the app;
 superimposing, by the contextual overlay system, a visual selector overlay on each of a plurality of pages of the app displayed on the device as the app runs on the device, wherein each page corresponds to a foreground activity of the app and wherein the superimposing is responsive to receiving user input navigating to the plurality of pages;
 detecting, by the contextual overlay system, contextual information corresponding to the foreground activity of each page of the plurality of pages by, in response to each foreground activity transition, receiving a callback from an operating system of the device, wherein the callback contains the contextual information as a payload, and wherein for each foreground activity transition the contextual information includes an activity name of an activity of the app, wherein the activity of the app is a member of an activity class that provides a window in which the respective page is presented as a user interface of the app;
 presenting to the user and within the visual selector overlay the contextual information for each foreground activity of the plurality of pages from the respective callback as each foreground activity is displayed; and responsive to a user selection of a selectable control displayed as part of the visual selector overlay, adding, using the contextual overlay system, the contextual information as displayed by the visual selector overlay for user selected ones of the plurality of pages to a list for the app and storing the list on the device in response to received user input, wherein the list specifies user-selected activities of the app determined from the plurality of pages as selected during navigation of the app by the user.

9. The system of claim 8, wherein the processor is configured to initiate operations further comprising:

updating the visual selector overlay responsive to each respective callback received in response to a foreground activity transition of the app to display the name of the foreground activity from the payload of the callback.

10. The system of claim 8, wherein the processor is configured to initiate operations further including:

receiving further user input specifying one or more modifications to the list; and modifying the list based on the one or more modifications specified;

wherein the modifying is performed without the user navigating between the plurality of pages.

11. The system of claim 8, wherein the processor is configured to initiate operations further including:

displaying an interface that includes the list of the activities of the app; and in response to receiving a user input selecting an element displayed in the interface, opening an activity of the app.

12. The system of claim 8, wherein the processor is configured to initiate operations further including:

setting barcode formatting for one or more of the activities of the list that utilize barcode scanning.

13. The system of claim 12, wherein the processor is configured to initiate operations further including:

receiving further user input identifying an activity within the list; and responsive to additional user input expanding the visual selector overlay to display a plurality of activities related to the activity identified based on the further user input.

14. A computer program product, the computer program product comprising:

one or more computer-readable storage media and program instructions collectively stored on the one or more computer-readable storage media, the program instructions executable by a processor to cause the processor to initiate operations including:

running a contextual overlay system on a device as part of a capture app concurrently with running an app installed on the device, wherein the contextual overlay system is configured to navigate the app;

superimposing, by the contextual overlay system, a visual selector overlay on each of a plurality of pages of the app displayed on the device as the app runs on the device, wherein each page corresponds to a foreground activity of the app and wherein the superimposing is responsive to receiving user input navigating to the plurality of pages;

detecting, by the contextual overlay system, contextual information corresponding to the foreground activity of each page of the plurality of pages by, in response to each foreground activity transition, receiving a callback from an operating system of the device, wherein the callback contains the contextual information as a payload, and wherein for each foreground activity transition the contextual information includes an activity name of an activity of the app that provides a window in which the respective page is presented as a user interface of the app;

presenting to the user and within the visual selector overlay the contextual information for each foreground activity of the plurality of pages from the respective callback as each foreground activity is displayed; and responsive to a user selection of a selectable control displayed as part of the visual selector overlay, adding, using the contextual overlay system, the contextual information as displayed by the visual selector overlay for user selected ones of the plurality of pages to a list for the app and storing the list on the device in response to received user input, wherein the list specifies user-selected activities of the app determined from the plurality of pages as selected during navigation of the app by the user.

15. The computer program product of claim 14, wherein the program instructions are executable by the processor to cause the processor to initiate operations further including:

updating the visual selector overlay responsive to each respective callback received in response to a foreground activity transition of the app to display the name of the foreground activity from the payload of the callback.

16. The computer program product of claim 14, wherein the program instructions are executable by the processor to cause the processor to initiate operations further including:

receiving further user input specifying one or more modifications to the list; and modifying the list based on the one or more modifications specified;

wherein the modifying is performed without the user navigating between the plurality of pages.

17. The computer program product of claim 14, wherein the program instructions are executable by the processor to cause the processor to initiate operations further including:

displaying an interface that includes the list of the activities of the app; and in response to receiving a user input selecting an element displayed in the interface, opening an activity of the app.

18. The computer program product of claim 14, wherein the visual selector overlay is collapsible and expandable.

19. The computer program product of claim 18, wherein the program instructions are executable by the processor to cause the processor to initiate operations further including:

receiving further user input identifying an activity within the list; and responsive to additional user input expanding the visual selector overlay to display a plurality of activities related to the activity identified based on the further user input.

20. The computer program product of claim 14, further comprising:

setting barcode formatting for one or more of the activities of the list that utilize barcode scanning.

* * * * *